United States Patent
Rao

(10) Patent No.: US 7,772,991 B2
(45) Date of Patent: Aug. 10, 2010

(54) ACCIDENT AVOIDANCE DURING VEHICLE BACKUP

(75) Inventor: Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 11/971,383

(22) Filed: Jan. 9, 2008

(65) Prior Publication Data

US 2009/0174536 A1    Jul. 9, 2009

(51) Int. Cl.
*G08G 1/017* (2006.01)
(52) U.S. Cl. .................. 340/937; 340/903; 340/435; 340/436; 348/148; 382/168; 382/170; 382/181
(58) Field of Classification Search ............. 340/937, 340/903, 932.2, 435, 436, 431, 438, 933; 348/148, 149, 700; 382/168, 170, 181
See application file for complete search history.

(56) References Cited

U.S. PATENT DOCUMENTS

| | | | |
|---|---|---|---|
| 5,646,614 A * | 7/1997 | Abersfelder et al. ..... | 340/932.2 |
| 6,268,803 B1 | 7/2001 | Gunderson et al. | |
| 6,483,442 B2 | 11/2002 | Shimizu et al. | |
| 6,919,917 B1 * | 7/2005 | Janssen ...................... | 348/143 |
| 7,034,668 B2 | 4/2006 | Engelman et al. | |
| 7,039,504 B2 | 5/2006 | Tanaka et al. | |
| 7,127,120 B2 * | 10/2006 | Hua et al. ................... | 382/254 |
| 7,378,947 B2 * | 5/2008 | Daura Luna et al. ........ | 340/435 |
| 2004/0051634 A1 | 3/2004 | Schofield et al. | |
| 2005/0073433 A1 | 4/2005 | Gunderson et al. | |
| 2006/0119473 A1 | 6/2006 | Gunderson et al. | |
| 2006/0125919 A1 | 6/2006 | Camilleri et al. | |
| 2006/0185921 A1 | 8/2006 | Cieler et al. | |

* cited by examiner

*Primary Examiner*—Davetta W Goins
(74) *Attorney, Agent, or Firm*—Franklin MacKenzie; Ford Global Technologies, LLC

(57) ABSTRACT

In one embodiment, the present invention is directed to a method to operate a host vehicle having a rearview camera vision sensor, and an electronic controller with memory. The method comprises the steps of determining whether the host vehicle is in reverse gear, activating a rearview camera vision sensor on said host vehicle to detect objects, determining host vehicle motion and path of travel, simultaneously determining an inter-frame difference metric and a histogram difference metric of the field of view of said rearview camera, determining a dynamic scene change, determining a collision threat assessment based upon said dynamic scene change, and activating warnings and collision avoidance moves.

8 Claims, 2 Drawing Sheets

ACCIDENT AVOIDANCE DURING VEHICLE BACKUP

TECHNICAL FIELD

The present invention relates to an improved camera vision based accident avoidance system and method of operation during vehicle back-up or when traveling in reverse.

During vehicle backing up operations, vehicle speed is generally low, but the potential exists for accidents with both static and moving objects. Impacts with stationary objects (except in the case of impacts with stationary animate objects) are less critical than impacts with moving objects. Impact with moving objects cover cases, such as, walking and running pedestrians, bicycle riders, children, animals, vehicles and other objects in motion. A system that can provide a warning to a vehicle operator while a vehicle is in reverse gear that an object is in motion and may present an impact hazard in real time, and automatically take accident avoidance measures, is an advance in the art.

BRIEF SUMMARY OF THE INVENTION

In one embodiment, the current invention describes a method to operate a host vehicle having a rear view camera vision sensor system, which, in addition to displaying the rear field of view and projected trajectory of the host vehicle, also warns the driver and autonomously activates the vehicle braking system under certain conditions. The system may also warn the pedestrians and other by-standers by sounding horns, by flashing lights or by other suitable means.

For example, the system may warn the driver if it sees moving objects in the projected trajectory of the host vehicle. The warnings may be of varying intensity depending on the position of the moving object in the back-up trajectory. The camera field of vision preferably has overlaid trajectory lines covering a width slightly larger than the host vehicle along the host vehicle projected path and a middle vision zone between the trajectory lines. If the object is in the middle vision zone and closer to the host vehicle, the warning may be more intense as compared to the presence of moving objects in the further away middle vision zone marked with the trajectory lines. The vehicle may be programmed to automatically activate the braking system, if it observes a moving object in the near middle vision zone of the predicted back-up trajectory.

In an alternate embodiment of this invention, again the whole field of view of the rear camera may be used. The field of view may be divided by the trajectory lines into middle vision zone and external zones, with the braking system being activated when an object is seen in the near middle vision zone, and warning signals of varying intensities being given to the driver and by-standers based on the distance of the moving object from the back of the vehicle in the middle vision zone.

DETAILED DESCRIPTION OF THE INVENTION

Figure 1:
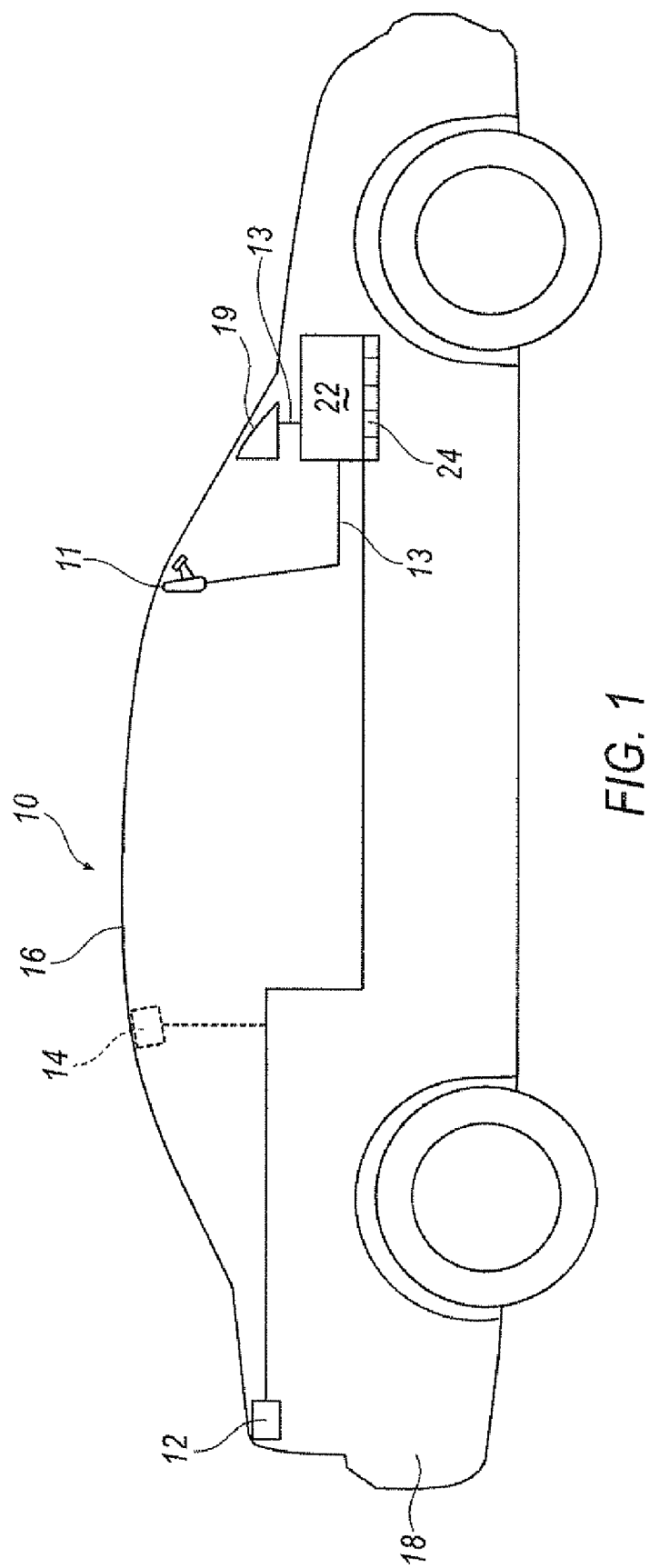
FIG. 1 is a schematic representation of an automobile vehicle equipped with a rear view camera system.

Turning now to the drawings and particularly to FIG. 1, system 10 is comprised of at least one, and preferably multiple vision based sensors 12, 14, such as cameras, which may be positioned on a host vehicle 16, such that they are in the rear 18 of the vehicle so that the rear portion and any blind spots are under surveillance. While the rear of a vehicle is discussed, it is apparent to those skilled in the art that the rear and both sides of the vehicle may be equipped with identical vision based sensors, such as cameras, and are equally covered. When the vehicle reverse gear is engaged, a display of the seamlessly integrated images as perceived by the rear view cameras may be displayed in the interior mounted rear view mirror 1, or preferably with a display panel 19 on the instrument panel to provide rear view information to the vehicle operators. In addition, rear view mirror 1I and display panel 19 are electronically connected at connection 13 to ECU 22 so that a warning alert for detected moving objects within the field of vision that may pose a collision threat can be signaled through the display, rear view mirror and other suitable means. The accident avoidance and rear collision warning system is designed to operate when the vehicle rear gear is engaged, and when the vehicle is operating or traveling in a rearward direction. The input from the vision sensors, such as cameras, is also transmitted to an electronic control module (ECU) 22 with memory 24. The ECU has a memory such as PROM, EPROM, EEPROM, Flash, or any other memory, and various tables are contained therein wherein maximum and minimum ranges or thresholds for collision avoidance, as well as collision avoidance actions are stored. Specifically, as the vision sensor data are received, comparisons are made between frames of the camera image to determine whether the objects detected are moving or dynamic objects according to the method set forth in FIG. 2. The camera system described has middle vision zone and trajectory lines, to detect objects that are directly behind the vehicle, or are dynamic (i.e., moving away from or toward the rear of the vehicle).

Figure 2:
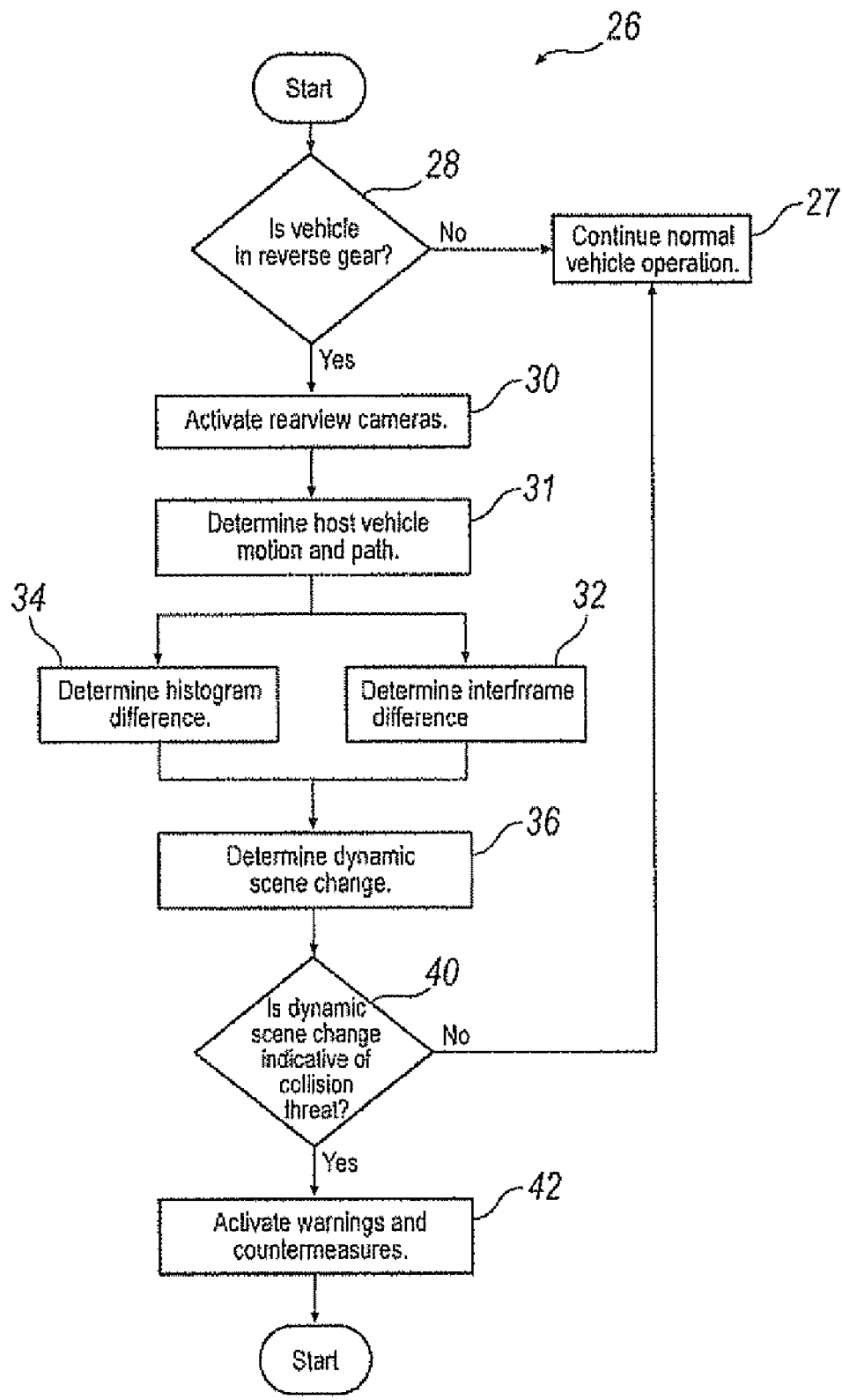
FIG. 2 is a software flow chart of one method according to the present invention.

FIG. 2 is a software flow chart representing one method 26 intended in the concept of the present invention. Specifically, step 28 is determining whether the vehicle is in reverse gear. If no, step 27 is to continue normal vehicle operation. If yes, step 30 is activate rear view cameras to transmit image. Signals indicative of images perceived by the camera are transmitted to the display and ECM where the detection of moving, or dynamic objects is made. Step 31 is determining host vehicle motion and path using host vehicle sensor data and projecting the host vehicle path trajectory on the display devices. Step 32 is determining the inter-frame difference metric for objects perceived by the camera based on frame comparison, to a predetermined threshold value as will be fully set forth later in this description. Preferably simultaneously, step 34 is determining a histogram difference metric to a predetermined threshold level. Each of the above described determinations is used at step 36 for detecting a scene change as perceived by the camera. The ECM makes a collision threat assessment at step 40 and, if the threat assessment meets a predetermined threshold, warnings and countermeasures are activated at step 42. If the threat assessment does not meet a predetermined threshold, normal vehicle operation is continued at step 27.

In greater detail, inter-frame and histogram difference metrics between successive picture frames are used to identify sudden scene changes in the back-up camera's field of view to detect the presence of moving or dynamic objects. To further enhance the accuracy of inter-frame comparisons, the ego-motion effects of the backing-up vehicle may be accounted for in inter-frame comparisons at the pixel level.

Two independent metrics, namely, inter-frame difference metric and histogram difference metric are used to improve the robustness of scene change assessment to host vehicle motion and scene illumination changes. Scene changes are identified by comparing each of the computed metrics to threshold levels associated with the respective difference metric.

The inter-frame difference is calculated as:

$$dt = \sqrt{\left(1/MN * \sum_{ij}(f_{xy}(t) - f_{xy}(t-1))^2\right)}$$

Wherein, $f_{xy}(t)$ is the pixel value at the frame location (x, y) and M and N are the number of pixels in the x and y directions respectively.

The inter-frame difference metric can be used to detect dynamic scene changes in the following manner. If one lets the inter-frame difference signal at location (ij) be represented by $$d_{ij} = f_{ij}(t) - f_{ij}(t-1)$$

Then the test or condition determined by the formula, $$\sum_{ij} d_{ij}^2 \geq \tau_d$$

Where $\tau_d \geq 0$ is a suitable threshold, has been determined to be a good indicator of dynamic motion in the scene. For a suitable dynamic threshold $\tau_d$, the minimum (min) and maximum (max) values of the inter-frame difference metric for a frame may be determined and the threshold may be computed as follows:

$$\tau_d \text{min} + (\text{max} - \text{min})/3$$

The method further contemplates determining a histogram difference metric. In this regard, the intensity range of a given frame is divided into a number of predefined bins. Each bin corresponds to an intensity range. The number of pixels in each bin is counted to generate the corresponding distribution comprising the histogram.

Once the histogram is determined, the histogram difference metric between frames is calculated as follows:

$$h_t = (1/N_b) \sum_b \|{}^h r_b(t) - {}^h r_b(t-1)\|$$

Where, $N_b$ is the number of bins and ${}^h r_b(t)$ is the count in the bin b at time t.

With the histogram difference technique, for dynamic or abrupt scene change the preferred metrics is:

$$h_t = (1/N_b) \sum_b \|{}^h r_b(t) - {}^h r_b(t-1)\| \geq \tau_h \quad \text{(Equation 5)}$$

Where, $\tau_h$ is an appropriate threshold.

By using both the inter-frame difference metric and the histogram difference metric as described above, it is possible to provide an intelligent, vision based rear view accident avoidance system that can detect dynamic changes in objects in the field of vision and provide warnings to the vehicle operator or, in some instances, undertake accident avoidance measures such as automatically applying the brakes or other measures such as activation of warning lights or audio warnings or haptic warnings to ensure that rearward travel accidents are avoided.

The words used in the specification are understood to be words of description, not words of limitation. While one aspect has been described related to the proposed invention, those skilled in the art will recognize that many variations are possible without departing from the scope and spirit of the invention as set forth in the appended claims.

What is claimed as new and desired to be protected by Letters Patent of the United States is:

1. A method to operate a host vehicle having a rearview camera vision sensor, and an electronic controller with memory, comprising:
    determining whether the host vehicle is in reverse gear;
    activating a rearview camera vision sensor on said host vehicle to monitor the camera field of view and detect moving objects;
    determining host vehicle motion and path of travel;
    simultaneously determining an inter-frame difference metric and a histogram difference metric of the field of view of the said rearview camera;
    determining a dynamic scene change;
    determining a collision threat assessment based upon said dynamic scene change; and
    activating warnings and collision avoidance moves.

2. The method of claim 1, wherein said inter-frame difference metric is determined according to the formula:

$$dt = \sqrt{\left(1/MN * \sum_{ij}(f_{xy}(t) - f_{xy}(t-1))^2\right)}$$

Wherein $f_{xy}(t)$ is the pixel value at the frame location (x, y); and M and N are the number of pixels in the x and y directions respectively.

3. The method of claim 1, wherein said inter-frame difference metric is used to detect dynamic scene changes according to the formula:

$$d_{ij} = f_{ij}(t) - f_{ij}(t-1)$$

Wherein, $f_{ij}(t)$ is the pixel value at the frame location (ij); then applying:

$$\sum_{ij} d_{ij}^2 \geq \tau_d$$

Where $\tau_d \geq 0$ is taken as an inter-frame dynamic motion threshold.

4. The method of claim 3, wherein said threshold is selected according to the formula:

$$\tau_x = \min + \frac{\max - \min}{3}$$

Where min and max are the minimum and maximum values of the inter-frame difference for a frame.

5. The method of claim 1, wherein said histogram difference between frames is determined according to the formula:

$$h_t = (1/N_b)\sum_b \|{}^h r_b(t) - {}^h r_b(t-1)\|$$

Wherein: $N_b$ is the number of bins and
${}^h r_b(t)$ is the count in the bin b at the time t.

6. The method of claim 1, wherein said histogram difference metric for dynamic scene changes is determined according to the formula:

$$h_t = (1/N_b)\sum_b \|{}^h r_b(t) - {}^h r_b(t-1)\| \geq \tau_h$$

Wherein, $\tau_h$ is an appropriate threshold.

7. The method of claim 1, wherein said warnings and collision avoidance moves include automatically applying vehicle brakes, flashing lights, and providing audio signals to warn by-standers.

8. The method of claim 1, wherein said warnings and collision avoidance moves further include providing haptic, audio and visual warning signals to the vehicle operator.

* * * * *